United States Patent [19]

Malafosse

[11] 4,118,465

[45] Oct. 3, 1978

[54] PROCESS FOR THE PREPARATION OF SODIUM PERCARBONATE AS REGULAR RHOMBOHEDRAL CRYSTALS

[75] Inventor: Jean Malafosse, Sassenage, France

[73] Assignee: L'Air Liquide, Societe Anonyme pour l'Etude et l'Exploitation des Procedes Georges Claude, Paris, France

[21] Appl. No.: 780,347

[22] Filed: Mar. 23, 1977

[30] Foreign Application Priority Data

Mar. 29, 1976 [FR] France .............................. 76 08989

[51] Int. Cl.$^2$ ............................................. C01B 15/10
[52] U.S. Cl. ................................................ 423/415 P
[58] Field of Search ................... 423/415, 415 P, 421

[56] References Cited

U.S. PATENT DOCUMENTS

| 1,036,316 | 8/1912 | Ormandy et al. ..................... 423/421 |
| 3,883,640 | 5/1975 | Smart ................................ 423/415 P |

FOREIGN PATENT DOCUMENTS 549,841  12/1942  United Kingdom ................ 423/415 P

*Primary Examiner*—Earl C. Thomas
*Attorney, Agent, or Firm*—Browdy and Neimark

[57] ABSTRACT

A process for the preparation of sodium percarbonate is disclosed in which concentrated hydrogen peroxide is caused to act generally in the presence of a crystallization modifier on a fluid suspension of sodium carbonate decahydrate in a substantially saturated solution of sodium carbonate, the sodium carbonate decahydrate being in a quantity such that the enthalpy of its dissolution compensates for the enthalpy of crystallization or formation of the sodium percarbonate or other exothermic phenomena. The process is applicable to obtaining sodium percarbonate, of which the elementary particle is a regular rhombohedric crystal.

15 Claims, No Drawings

PROCESS FOR THE PREPARATION OF SODIUM PERCARBONATE AS REGULAR RHOMBOHEDRAL CRYSTALS

BACKGROUND OF THE INVENTION

This invention relates to a process for preparing sodium percarbonate in the form of a powder with a narrow grain size range, high apparent density and resistant to abrasion, and of which the elementary particle is a regular rhombohedral crystal.

The conventional procedure for obtaining sodium percarbonate, $Na_2CO_3 \cdot 1.5 H_2O_2$, using the wet method, consists in mixing a solution of anhydrous sodium carbonate, $Na_2CO_3$, and a solution of hydrogen peroxide.

The percarbonate crystallises and this phenomenon is exothermic. In order to obtain the best yields with respect to the hydrogen peroxide used, it is necessary to keep the crystalliser at a temperature equal to or lower than 15° C.

This elimination of the calories liberated by crystallisation is effected by heat exchange with cold brine through the metal walls of the crystalliser and/or coils and/or various cooling arrangements. The inconvenience of this system is the tendency of the solid percarbonate to adhere to the cold walls. In order to obtain a stable product having good particle size characteristics, it is necessary to introduce into the crystalliser agents which modify crystallisation and stabilisers, such as sodium silicate, which favour the formation of precipitates; the above-mentioned encrustation rapidly reduces the exchange capacities of the apparatus and, all things being equal, the temperature rises, and this increases the speed of decomposition of the active oxygen present in the medium in the solid or light phases; as this decomposition phenomenon is itself exothermic, the heating process is automatically accelerated; the resulting yield thus becomes much too low and the apparatus functions in an irregular manner.

It is possible to overcome these inconveniences either by decreasing the quantity of heat generated in the crystalliser by reducing the rates of flow, but as a consequence thereby lowering the production capacity of the apparatus; or by effecting mechanical scraping of the walls of the apparatus, but this is not always easy to carry out in practice. Another disadvantage of this process consists in the relatively low solubility of the carbonate in the water, while that of the percarbonate is fairly high; also the use of carbonate in solution leads to the crystallisation occurring in a relatively dilute medium, which reduces production capacity and yield, because the active oxygen in an alkaline medium is of particularly low stability.

Finally, a third disadvantage of the process is the requirement of a cooling source in a relatively troublesome form, since it is only possible to lower the temperature of the crystalliser to below 15° C. by using brine having a temperature which is between 0° and 10° C.

SUMMARY OF THE INVENTION

The process of the present invention ameliorates or overcomes all these disadvantages by utilising in the crystallisation medium an endothermic procedure which compensates for the exothermic nature of the crystallisation reaction. It presents a certain number of advantages with respect to other wet method processes, especially in respect of the yield, which is increased (the carbonate concentration of the medium being much higher) and especially as regards heat exchange.

The phenomenon which is preferably chosen in order to compensate for the exothermy of the crystallisation is the endothermy of dissolution of sodium carbonate decahydrate. Accordingly, the present invention provides a process for the preparation of sodium percarbonate in the form of regular rhombohedral crystals by reaction of hydrogen peroxide and sodium carbonate, in which concentrated hydrogen peroxide is caused to act on a fluid suspension of sodium carbonate decahydrate in a substantially saturated solution of sodium carbonate, the sodium carbonate decahydrate being present in a quantity such that the enthalpy of its dissolution compensates for the enthalpy of crystallisation or formation of sodium percarbonate and any other exothermic phenomena occurring in the suspension, at least in part, to give regular rhombohedral crystals of sodium percarbonate.

The dissolution in water of $Na_2CO_3 \cdot 10 H_2O$ is highly endothermic and, while the preparation of percarbonate from aqueous solutions of hydrogen peroxide and carbonate necessitates removal of a considerable quantity of heat, the addition of $H_2O_2$, even in concentrated form, to a suspension of decahydrate in a saturated aqueous solution of carbonate leads to a totally endothermic reaction, provided that the quantity of decahydrate is sufficient. Consequently, a homogeneous cooling is obtained in all parts of the crystalliser; there is no longer any danger of a deposit being formed which, by slowing down heat exchange, causes a spontaneously accelerated decomposition of the hydrogen peroxide, with a loss in yield and possibly total decomposition.

In the process of the invention, it is nevertheless necessary to provide energy for crystallising the decahydrate, but it is sufficient to cool the solution from 40° C. to 24° C., and this can be effected with very inexpensive cooling sources.

Several processes such as that of British Pat. No. 549,841 are known for preparing percarbonate which take advantage of this property of the decahydrate; in such processes, $H_2O_2$ and the solid hydrated salt are mixed and, by this means, the crystalliser in which the formation of the percarbonate is effected is automatically cooled. However, a disadvantage of these processes is that a solid phase is used which is more difficult to handle than a liquid.

On the other hand, the conventional commercial form of the $Na_2CO_3$ is the anhydrous salt, the preparation of the hydrate being effected by dissolution, crystallisation, hydroextraction and drying, which is a considerable burden in connection with the process for manufacturing the percarbonate.

In the present invention, concentrated hydrogen peroxide is caused to react with a fluid suspension of sodium carbonate decahydrate in a saturated or near saturated solution of sodium carbonate, the solid sodium carbonate decahydrate being in a quantity such that the dissolution enthalpy of the solid compensates for the crystallisation or formation enthalpy of sodium percarbonate and the other phenomena which use up negative calories, such as the cooling of solid and liquid phases to the crystallisation temperature, the dilution and possibly a slight decomposition of the hydrogen peroxide.

This suspension remains fluid and can be handled like a liquid. It is consequently possible either to prepare the suspension in a first reactor and to crystallise the percarbonate in a second apparatus, or to use a single apparatus for both operations.

Moreover, it has been found that the use of an aqueous suspension of sodium carbonate decahydrate, of which all or part of the crystals are in the form of rhombohedrons, favours the formation of sodium percarbonate in the form of rhombohedral crystals. The rhombohedral form of sodium percarbonate presents advantages as regards the grain size and the pourability of the product.

It is also possible to assist the obtaining of rhombohedrons at the moment of the crystallisation of the sodium carbonate decahydrate by operating in the presence of sulphate ions, $SO_4^=$. The content of $SO_4^=$ ion may advantageously reach up to 1.35% by weight, related to the crystallisation medium.

DESCRIPTION OF THE PREFERRED EMBODIMENTS

It is advantageous to conduct the preparation and the crystallisation of the sodium percarbonate in the presence of a crystallisation modifier, this being a product permitting the solubility of the sodium percarbonate in the mother liquors to be increased.

It was found that organic polymers characterised by the presence of a large number of carboxyl functions $-COO^-$ permit valuable results to be obtained.

Among the organic polymers with a high content of free carboxyl groups, the derivatives of maleic anhydride or of maleic and fumaric acids have a very favourable influence on the crystallisation of the sodium percarbonate. The copolymers of maleic anhydride with ethylene, propylene, isobutylene, styrene, methyl vinyl ether, furan, and other unsaturated monomers are excellent agents for improving the characteristics of the crystals. The copolymers of maleic anhydride and methyl vinyl ether with a molecular weight in the range 100,000 to 2,000,000, preferably from 500,000 to 1,125,000, are particularly suitable.

The polycarboxylic polymer is used in amounts which are advantageously from 0.01 to 1 g per mole of sodium carbonate being employed, preferably from 0.03 to 0.1 g per mole.

It was also found to be of interest to use a crystallisation modifier comprising a mixture of sodium hexametaphosphate and polycarboxyl polymer. The introduction of the sodium hexametaphosphate and polycarboxylic polymer mixture, in amounts as regards hexametaphosphate which are preferably from 0.1 to 5 g per mole of sodium carbonate being employed, preferably between 0.5 and 2 g per mole, permits well-crystallised sodium percarbonate to be obtained with a narrow particle size range and possessing resistance to abrasion.

The crystallisation medium in which the precipitation of the sodium percarbonate is effected may in addition contain the usual stabilisers, for example a divalent magnesium salt, for increasing the solidity of the grains; sodium silicate, which acts as stabiliser during storage of solid percarbonate; organic sequestrating agents which minimise the loss of active oxygen during the reaction and during the storage of the mother liquors; and sodium chloride which improves the yield by decreasing the solubility of the percarbonate.

The preparation of the decahydrate suspension may be effected from mother liquors or residual liquors from a previous operation, recharged with anhydrous carbonate in such a manner that the total content of $Na_2CO_3$ is between 20 and 30% by weight, preferably between 25 and 28%, related to the liquid medium.

The content of $SO_4^=$ ion will generally be from 0 to 1.35% and preferably from 0.2 to 0.8% by weight. The content of $H_2O_2$ is advantageously less than 2%, while that of NaCl will generally be from 0 to 2.5%, preferably from 1.5 to 2% by weight. The content of $Mg^{++}$ will generally be from 0 to 0.15% and preferably from 0.06 to 0.08% by weight. The silica content (in soluble glass form) will generally be from 0 to 0.5% and is preferably from 0.3 to 0.4% by weight. The polycarboxylic polymer content will generally be from 0.01 to 1 g per mole of carbonate being employed, and is preferably from 0.03 to 0.1 g per mole. The content of sodium hexametaphosphate will generally be from 0 to 1%, and is preferably from 0.2 to 0.5% by weight.

A mixture constituted in accordance with the above composition will be heated by the exothermal dissolution of the anhydrous carbonate, and its temperature will be able to reach 37°–38° or higher; cooling is effected by any suitable means and the temperature is lowered to a level such that the solid phase represents 15 to 40% of the two-phase mixture, and preferably 22 to 33%; if the crystallisation of the decahydrate is not spontaneously produced, it is initiated by adding a small amount of solid decahydrate; when the temperature of the mixture is lower than or equal to 32° C.

The percarbonate can then be prepared by adding to the above suspension an aqueous solution of hydrogen peroxide having a concentration which is preferably from 30 to 98%, more preferably about 70%, in such a quantity that the molar ratio of $H_2O_2/Na_2CO_3$ is less than or equal to 1.25. An endothermic effect is produced, which lowers the temperature of the mixture to the region of 16° to 18° C.

With completion of crystallisation, further anhydrous carbonate is preferably added to the rate of 0 to 20% of the quantity initially employed, preferably 8 to 12%; this salting out operation has the effect of improving the yield.

After hydroextraction and drying in a stream of hot air at 60° C., a percarbonate is obtained which has the following properties:

$H_2O_2\% > 30\%$ granulometry (standard DIN 4190)

$n > 3$ $d$ average 550–750 $\mu$
$d$ apparent $> 0.7$

Examples illustrating the invention are given below, without these examples having any limiting effect on the scope of the invention.

EXAMPLE 1

In a 25-liter stainless steel reactor equipped with a double casing and a coil for cooling and heating purposes and an anchor-type agitator, are placed 11.9 kg of mother liquors from a preceding operation and 4.9 kg of water; and 4.120 kg of anhydrous sodium carbonate. The various additives and stabilisers are added in such a manner that the composition of the medium by weight is as follows:

| | | | |
|---|---|---|---|
| $Na_2CO_3$ | 27% | $Mg^{++}$ | 0.07% |

-continued

| H₂O₂ | 1.63% | hexametaphosphate | 0.45% |
| NaCl | 1.9% | silica | 0.4% |
| SO₄ | 0.27% | "Gantrez AN 169" | 110 ppm |

The silica is introduced in soluble glass form (38°–40° Be). The "Gantrez AN 169" is a maleic anhydridemethyl vinyl ether copolymer, which is sold under this commercial mark.

At the moment of adding the anhydrous carbonate, the temperature rises to 36° C.; cooling is then effected by a stream of water in the double jacket or casing and the coil down to a temperature of 24.5° C. in 135 minutes; during this cooling, the crystallisation of the decahydrate is spontaneous and does not require any initiation. 2470 ml of 70% $H_2O_2$ are then added over a period of 50 minutes during which time the temperature falls to 18°–19° C. The reactor is left for 20 minutes and then hydroextraction takes place; this is followed by drying under a stream of hot air at 60° C.; 5.33 kg of dry percarbonate are obtained, titrating 30.9% $H_2O_2$, corresponding to a yield relative to $H_2O_2$ of 67.5%.

The granulometric analysis is carried out on a "ROTAP" machine for 3 minutes on a sample of 50 g; as accumulated oversize material, it provides:

| 1250 μm | 0.1% |
| 800 μm | 7.2% |
| 400 μm | 74.9% |
| 200 μm | 98.9% |
| 149 μm | 99.7% |
| 100 μm | 99.9% | that is to say, in accordance with the DIN 4190 standard;

$n = 3.69; d = 657 \mu$ apparent density: 0.9

The solidity (or resistance to abrasion) is evaluated by measuring the increase in the material passing through the 149 micron screen after grinding a sample of 50 g, placed in a 1-liter glass jar containing 200 stainless steel balls (diameter: 0.65 mm), rotating for 1 hour at 19 rpm about a horizontal shaft (one reversal of the jar with each revolution); if $\Delta n'$ is the increase in the material passing through at 149 μm, the solidity is expressed by $100 - \Delta n = s$; in the example in question, it is 84%.

EXAMPLE 2

The process is carried out under similar conditions to those of Example 1, but on completion of the operation, 423 g of anhydrous carbon are added for salting out purposes; the temperature rises towards 21°–22° C.; crystallisation is allowed to take place for 20 minutes; the percarbonate is obtained with a yield of 73.5% and this percarbonate shows the following analyses:

| oversize at | 1250 μm | 0.2% |
| | 800 | 14.4 |
| | 400 | 74.3 |
| | 200 | 98.2 |
| | 149 | 99.2 |
| | 100 | 99.8 |
| i.e. | n = 3.24 | |
| | d = 662 μ | |
| apparent density | 0.84 | |
| solidity | 75% | |

EXAMPLE 3

In a glass reactor as used in a laboratory and equipped with an agitator and a double casing for cooling purposes there is placed a mixture similar to the mother liquors and formed of:
375 g of water
10.9 g of NaCl
45 g of $Na_2CO_3$
13.2 g of 70.8% $H_2O_2$
3.4 g of $MgSO_4.7H_2O$
2.25 g of hexametaphosphate
0.3675 g of a 17% solution of "LYSSACRIL" S 12
4.35 ml of soluble glass, 38°–40° Be.

109.3 g of anhydrous $Na_2CO_3$ are added; the temperature rises to 38° C.; the vessel is cooled; crystallisation is initiated at 26° C. and the temperature is lowered to 24° C.; the total cooling time is 2 hours 10 minutes. 74.2 g of 70.8% $H_2O_2$ are then added over 15 minutes. Crystallisation is allowed to take place for 20 minutes, followed by hydroextraction and drying at 60° C. under an air stream; the analysis of the product as follows:

| oversize at 1250 μm | 0.6% |
| 800 | 3.8 |
| 400 | 83.2 |
| 200 | 99.4 |
| 149 | 99.8 |
| 100 | 99.8 |
| i.e., according to DIN 4190 | n = 3.6 |
| | d = 698 |
| solidity 50%. | |

"LYSSACRYL S 12" is a maleic acid — styrene copolymer, sold under this commercial mark.

EXAMPLE 4

The operation is carried out under the same conditions as in Example 3, but replacing the "LYSSACRYL S 12" by "EMA 21" in the dosage of 62.5 mg of pure product; "EMA 21" is a copolymer of maleic anhydride and ethylene, sold under this commercial mark.

What is claimed is:

1. Crystalline sodium percarbonate in the form of regular rhombohedral crystals and having a narrow range of grain size, high apparent density and being resistant to abrasion.

2. A process for the preparation of the sodium percarbonate in the form of regular rhombohedral crystals by reaction of concentrated hydrogen peroxide and a suspension of sodium carbonte decahydrate at least partly in the rhombohedral form, comprising
    preparing the decahydrate suspension by dissolving solid anhydrous carbonate in residual liquor obtained from an earlier batch crystallization of the percarbonate and bringing the decahydrate suspension to a temperature of at least 37° C. by utilizing the dissolution heat of the anhydrous carbonate,
    cooling the decahydrate suspension and initiating the crystallization of the decahydrated carbonate at a temperature lower than or equal to 32° C., said decahydrate suspension further comprising sulfate ion $SO_4^=$ and a crystallization modifier polymer having a large number of carboxyl groups selected from the group consisting of polycarboxylic polymers and copolymers of maleic anhydride, maleic acid and fumaric acid, adding the hydrogen peroxide and lowering the temperature down to a level such that the solid phase present represents from 15 to 40% of the two-phase mixture.

3. A process according to claim 2, wherein there is used a crystallisation modifier which is a copolymer formed from first monomers selected from the group consisting of maleic anhydride, maleic acid and fumaric acid, and second monomers selected from the group consisting of ethylene, propylene, isobutylene, styrene, methyl vinyl ether and furan.

4. A process according to claim 2, which is carried out in the presence of at least one compound selected from the group consisting of magnesium salts, sodium silicate, sequestrating agents and sodium chloride.

5. A process according to claim 2, wherein the solid phase in the decahydrate suspension comprises 22 to 33% of the two-phase mixture, and the content of $SO_4^=$ ion is no greater than 1.35% by weight; the polymer or copolymer being present in an amount of 0.01 to 1 g per mole of sodium carbonate.

6. A process according to claim 2, wherein the content of $SO_4^=$ ion is 0.2 to 0.8% by weight, and the amount of polymer or copolymer is 0.03 to 0.1 g per mole of sodium carbonate.

7. A process according to claim 2, wherein the crystallization modifier is a mixture of sodium hexametaphosphate and said polycarboxylic polymer.

8. A process according to claim 7, wherein the amount of sodium hexametaphosphate is 0.1 to 5 g per mole of sodium carbonate.

9. A process according to claim 7, wherein the amount of sodium metaphosphate is 0.5 to 2 g per mole of sodium carbonate.

10. A process according to claim 2, wherein the crystallization modifier is maleic acid-styrene copolymer or maleic anhydride-methyl vinyl ether copolymer.

11. A process according to claim 2, wherein the residual liquor obtained from an earlier batch crystallization of the percarbonate contains sodium chloride.

12. A process according to claim 11, wherein the sodium chloride is present in an amount less than or equal to 2.5% by weight.

13. A process according to claim 11, wherein the sodium chloride content is 1.5 to 2% by weight.

14. A process according to claim 2, wherein after the completion of the addition of hydrogen peroxide, a quantity of anhydrous sodium carbonate is added, said quantity being up to 20% of the initially used quantity.

15. In a process for the preparation of sodium percarbonate by the reaction of hydrogen peroxide and sodium carbonate decahydrate, the improvement comprising:

utilizing as a reaction medium a mixture comprising concentrated hydrogen peroxide, a fluid suspension of sodium carbonate decahydrate, and a saturated or nearly saturated solution of sodium carbonate, said sodium carbonate decahydrate being present in said reaction mixture at least partly in the form of rhombohedrons, said reaction being carried out by preparing a decahydrate suspension and then mixing said decahydrate suspension with an aqueous solution of hydrogen peroxide having a concentration which is 30–98%, in such a quantity that the malor ratio of $H_2O_2/Na_2CO_3$ is no greater than 1.25;

the reaction medium further comprising 0.2 to 1.35% by weight sulfate ion, and 0.01 to 1 g per mole, based on sodium carbonate, of a polycarboxylic polymer having a large number of free carboxylic groups and selected from the group consisting of polymers of maleic anhydride, of maleic acid and of fumaric acid, and copolymers of any of maleic anhydride, maleic acid and fumaric acid; the reaction medium also comprising from 0.1 to 5 g per mole based on sodium carbonate of sodium hexametaphosphate, an amount sufficient of a divalent magnesium salt to increase the solidity of the crystal grains of the resultant sodium percarbonate, a stabilizing-effective amount of sodium silicate, an amount sufficient of sequestering agent to minimize the loss of active oxygen during the reaction and during storage of the mother liquor, an amount sufficient of sodium chloride to improve the yield by decreasing the solubility of the percarbonate;

said decahydrate suspension having a total content of sodium carbonate between 20 and 30% by weight and containing no more than 2% of $H_2O_2$, the solid phase of said decahydrate suspension constituting 15–40% of said suspension.

* * * * *